United States Patent [19]
Entrop et al.

[11] Patent Number: 5,357,412
[45] Date of Patent: Oct. 18, 1994

[54] LINE ILLUMINATION DEVICE AND MOUNTING MEMBER FOR THIS DEVICE

[75] Inventors: Jean Paul Entrop; Gerrit J. Van Den Beld, both of Eindhoven, Netherlands

[73] Assignee: U.S. Philips Corporation, New York, N.Y.

[21] Appl. No.: 878,649

[22] Filed: May 5, 1992

[30] Foreign Application Priority Data

| May 7, 1991 | [EP] | European Pat. Off. | 91201091.5 |
| Sep. 17, 1991 | [EP] | European Pat. Off. | 91202386.8 |
| Apr. 10, 1992 | [EP] | European Pat. Off. | 92201033.5 |

[51] Int. Cl.$^5$ .............................. F21S 3/00
[52] U.S. Cl. .................... 362/219; 362/217; 362/223; 362/287
[58] Field of Search .......... 362/427, 217, 219, 221, 362/223, 260, 287, 225

[56] References Cited

U.S. PATENT DOCUMENTS

| D. 123,760 | 12/1940 | Heath | 362/219 |
| 1,042,587 | 10/1912 | Moore | 362/219 |
| 2,476,856 | 7/1949 | Geenens | 362/219 |
| 2,956,149 | 10/1960 | Dowell et al. | 362/219 |
| 3,202,814 | 8/1965 | Ceglia | 362/219 |
| 4,161,769 | 7/1979 | Elliott | 362/219 |
| 4,413,311 | 11/1983 | Orenstein | 362/223 |
| 4,712,165 | 12/1989 | Cetrone | 362/217 |
| 4,858,087 | 8/1989 | Hartshorn | 362/260 |
| 4,858,088 | 8/1989 | Agabekov | 362/223 |

FOREIGN PATENT DOCUMENTS

| 8505644 | 4/1985 | Fed. Rep. of Germany . |
| 919075 | 3/1960 | United Kingdom . |

OTHER PUBLICATIONS

Search Report.

*Primary Examiner*—Ira S. Lazarus
*Assistant Examiner*—Y. Quach
*Attorney, Agent, or Firm*—Bernard Franzblau

[57] ABSTRACT

A device for line illumination comprises a carrier and a plurality of double ended tubular fluorescent lamps arranged in line and mounted in pairs of lamp holders. Between each two lamps a capped, single ended compact fluorescent lamp is present and with its cap proximate the carrier. The device may also comprise a screen having a side facing the carrier. The tubular and the compact fluorescent lamps are then located at the side facing the carrier. A T-shaped, light transmitting mounting member is provided in which respective parts of two pairs of lamp holders are mounted, back to back, remote from each other, so as to allow a compact fluorescent lamp to be accommodated therebetween. The device provides a light line of homogeneous brightness giving an even illumination.

17 Claims, 8 Drawing Sheets

LINE ILLUMINATION DEVICE AND MOUNTING MEMBER FOR THIS DEVICE

BACKGROUND OF THE INVENTION

This invention relates to a line illumination device comprising
a carrier,
a plurality of tubular fluorescent lamps in linear arrangement which each have end portions with respective lamp caps,
lampholder pairs which are connected to the carrier and in each of which a respective lamp is held with its lamp caps.

The invention also relates to a mounting member suitable for use in said device.

Such a line illumination device is known from, inter alia, DE-GM-1 989 496.

The known device has the disadvantage that the light line formed during operation has interruptions because the lamp caps and the lampholders radiate no light. In addition, the dark zones present at the area of a lamp cap / a lampholder / a lampholder / a lamp cap are bounded on either side by zones which radiate only a small quantity of light. These zones are caused by the fact that the discharge in the lamps extends only between the electrodes positioned near the ends of the lamp vessel, but not also from each electrode to the adjacent end. The differences in brightness and the differences in illuminance caused by these dark and weakly luminous zones are unpleasant.

According to the Utility Model cited, these differences are reduced in that the lamps are made to overlap one another partly. It is possible then to position the lamps alternately in a first and in a second, parallel line. Disadvantages of this solution are that interruptions remain which cause unpleasant differences, that the device has a greater lateral dimension and inevitably has a meandering pattern. As a result, an illuminated field in addition gets the unevenness of a wavy pattern.

Another overlapping arrangement of the lamps known from the said Utility Model has a sawtooth shape. This arrangement has the same disadvantages as the previous one. Added to this is another disadvantage, i.e. a field illuminated by the lamps has a pattern which is to a high degree determined by the diagonal direction which the lamps have.

DE 284 537 discloses a line illumination device in which prismatic, mirroring bodies are positioned on each of the lampholders, which bodies throw the light coming from the lamps in a direction away from the carrier. The result is that light seems to be coming from the lampholder. This measure, however, only effects a small reduction in the unevenness of the illuminance and of the brightness of the light line. In fact, the prismatic bodies receive only that small fraction of light which is radiated by the lamp ends at a great angle to the perpendicular of these ends, while these ends already have a lower brightness than portions farther away from the ends. The prismatic bodies do not throw light towards the carrier.

SUMMARY OF THE INVENTION

An object of the invention is to provide a line illumination device of the kind described in the opening paragraph which offers a greater evenness in brightness and illuminance and avoids undesirable patterns.

According to the invention, this object is achieved in that between the two tubular fluorescent lamps a respective single-ended capped compact fluorescent lamp is accommodated with its lamp cap proximate the carrier.

In the device according to the invention, the dark and weakly radiating zones of the known light line are divided into two portions and an active, light-radiating element is added between these portions. The compact fluorescent lamp radiates light which compensates for the lack of light of the dark regions of the lampholder and the lamp cap, and the weakly radiating regions at the ends of the lamp vessel on either side of this compact lamp. It is important for this that the compact fluorescent lamp has a cap at one end only.

The discharge path in a compact fluorescent lamp is bent and/or angled, i.e. the shortest imaginary connecting line between the electrodes of the lamp inside the lamp vessel is bent and/or angled. There is only one lamp cap, for example, an Edison lamp cap or a lamp cap having contact pins, and the lamp has its greatest dimension in the extended direction of the lamp cap and transverse thereto it has smaller dimensions. The lamp as a result may be accommodated with its end remote from the lamp cap between two adjoining tubular lamps of the device. Often the lamps have two or more, for example four, tubular portions connected in series and positioned next to one another. The lamps are commercially available in various power ratings, for example, PL lamps having two tubular portions, PLC lamps having four tubular portions, possibly with an integrated electronic supply circuit.

It is favourable that compact fluorescent lamps have a higher specific wall load than tubular lamps, usually 500 W/m$^2$ or more, so that they have a higher brightness and are capable of compensating for the lack of light coming from adjoining locations in the line illumination device.

In a favourable embodiment of the line illumination device according to the invention, a screen is present with a side facing the carrier, while the tubular and the compact fluorescent lamps are arranged at the side of the screen which faces the carrier.

The screen may be impervious to light, for example, diffusely reflecting. The line illumination device then yields an illuminated field of great evenness on the carrier. Alternatively, however, the screen may be light-transmitting, for example, light-scattering, for example, diffusing or opal. The screen may also be transparent and colourless, for example for forming a closed space together with the carrier, in which space the lamps are present. The screen may be optically active, for example, coloured, may have light-diffracting elements such as lenses, prisms, or have other light-spreading characteristics, for example, owing to a profile such as semicylindrical ridges. The line illumination device with a light-transmitting screen results in a light line of an even brightness and, if applicable, an illuminated field of great evenness on the carrier.

The carrier may be a wall, for example, an exterior wall, a ceiling, a roof, canopy or porch edge, etc., or a covering mounted against it, for example, a panel board. The carrier may have a duct-shaped cavity in which a profile, for example having substantially a U-shape, is accommodated, other parts of the device, such as lampholders and possibly a screen, being fixed thereto. Supply means, such as ignition and/or dimming and/or stabilization means, and electric wiring for the lamps may also be accommodated in such a profile. A mounting member to be described below may also be fixed to such a profile. The advantage of such a profile is that segments may be previously assembled and cabled, so that segments of the device are completed when the profile and the lamps are provided against the carrier. This is particularly attractive when the carrier is much larger than the profile.

In a favourable embodiment, the device, which may or may not have a screen, comprises a mounting member which is connected to a lampholder positioned near the carrier. This lampholder may be fastened to or in the mounting member. The compact fluorescent lamp is accommodated in this mounting member with its lamp cap in said lampholder. At a distance from the carrier, respective parts of two lampholder pairs are accommodated in the mounting member for holding and supplying ends of the tubular lamps on either side of the compact fluorescent lamp. The mounting member is a useful means for connecting the lamps to the carrier in the desired geometrical arrangement.

In a favourable embodiment, the mounting member is a substantially light-transmitting, substantially T-shaped body. The leg of the T accommodates therein the compact fluorescent lamp, and the crossbar of the T accommodates the ends of two tubular lamps. The lampholders for said lamps may be manufactured from light-transmitting synthetic resin, if so desired, but this is usually not necessary.

A quick-acting coupling is obtained in an embodiment in which the mounting member has a bayonet coupling with the carrier or with a profile which is, for example, substantially U-shaped and which can be accommodated in a cavity of the carrier. In a convenient embodiment of this type, the mounting member has an interrupted first and a second circumferential collar, material of the carrier or of the profile being enclosed between said collars.

The mounting member may be provided with optically active means, for example, which may be light-scattering or light-spreading at a surface facing away from the carrier. This may be favourable in the presence of a light-transmitting screen, but also if no screen is present. Light diffusion may be obtained through local roughening or by frosting, which may or may not be obtained by means of a coating. Light spreading may be obtained, for example, by a profile, for example with prismatic or concave cylindrical grooves. Light from the compact lamp may be strongly deflected sideways by this.

Also, dependence on the distance between the screen and the carrier, it may be favourable for the mounting member to comprise optically active means near the carrier, for example, to be light-scattering. A local over-illumination of the carrier can then be counteracted, if this should occur without the measure. Alternatively, optically active means of the mounting member, for example means near the carrier, may comprise a colour filter or prismatic grooves, for example, running parallel to the carrier. Such grooves are capable of guiding light into the material of the mounting member and away from the carrier. A colour filter may be transparent or only translucent. It is favourable for this filter to have the same colour as the carrier or, depending on its position, as the screen. The filter can obviate that which is irradiated by the compact lamp through the filter has a colour which differs from the colour of adjoining regions. The filter may be integrated in the mounting member. The mounting member may be manufactured from coloured material, or the filter may be provided as a coating or film, for example as a foil, in or around the mounting member.

The mounting member may be closed when lamps are present. Insertion and replacement of lamps is very easy then in the case of a mounting member which is divided, for example, into a first and a second T-shaped part.

Alternatively, the mounting member may be divided into a T-shaped part and, for example, a substantially semi-cylindrical part. The actual shapes of parts of the mounting member can be chosen dependent upon the geometric proportions of the embodiment of the device. The proportions may be such that the crossbar of the T is relatively short compared with the leg.

Since a mounted compact fluorescent lamp occupies less space in the mounting member than it requires during its insertion into the lampholder, it may be desirable or necessary for the lampholder to be moveably provided so as to render the insertion and removal of the lamp easier or indeed possible. The lampholder may be arranged, for example, with tilting possibility about, for example, an axis parallel to the tubular lamps, so that a compact fluorescent lamp after its insertion into the lampholder is tilted along with the holder so as to enter the mounting member.

In outdoor applications, the mounting member may be used to seal off the lampholders of the tubular lamps in the presence of these lamps so as to be drip-proof and/or splash-proof, for example, through the use inter alia of O-rings around the end portions of the tubular lamps.

A favourable embodiment is one in which the mounting member is provided with a screwthread onto which a nut can be screwed which grips around a tubular lamp with a sealing ring, thus sealing the mounting member around this lamp. The screwthread may have an additional useful optical effect in that it helps to guide light introduced into the material of the mounting member to the exterior again.

It is also favourable when for the mounting member to have prismatic grooves remote from the carrier, which grooves are so formed that they spread the light issuing there. Grooves may be present elsewhere for guiding light into the material of the mounting member. Furthermore, bodies having the shape of cone segments may be present in the mounting member opposite the compact fluorescent lamp, also for guiding light into the material of the mounting member and thus distributing this light. Alternatively, conical bodies having, for example, radially extending prismatic grooves may be present laterally of the compact lamp, between the latter and the tubular lamps.

In an embodiment in which the mounting member has a first and a second T-shaped part and is provided with screwthread so as to be sealed around tubular lamps by means of nuts, said parts in a favourable modification are coupled at a first end by cooperating portions of these parts so as to be hinged, and are kept coupled together at a second end by nuts cooperating with the screwthread, otherwise they may be coupled in a detachable manner at a first end, for example, with a snap connection.

Depending on climatic conditions, it may be desirable for the tubular lamps to be each surrounded with clearance by a tube between their end portions, so that they can assume a desired operating temperature. A nut around the mounting member may then enclose said tube with, for example, a sealing ring, for example, made of rubber, such as, for example, silicone rubber. The nut may have, for example, a narrowing groove in which a flat ring having an excess dimension is enclosed so that this ring has assumed a conical shape. The tube may be made of, for example, glass or polymethyl methacrylate (PMMA).

When tubes are used around the tubular lamps, it is favourable to use for these lamps lampholders in which the lamp caps can be placed and make electrical contact in that they are made to perform a lateral translation. This translation may be forced on a lamp by means of such a tube which has been provided over the lamp and which insulates it from the outer world during operation.

The mounting member may be integral with a screen, for example, be included in a screen. The mounting member is then connected to the screen and may even form pan of the screen. The mounting member may in that case extend beyond an end portion alongside the relevant tubular lamps.

A screen will usually be at a distance from the tubular lamps which is less than ten times the diameter of the tubular lamps. The screen may be supported by these lamps.

The outward appearance of the screen may be selected from a wide variety. The screen may, for example, be flat or curved and be shaped from plating, foil or tubing, a tubular screen being capable of having various shapes in cross-section such as round, elliptical, or quadrilateral, for example rectangular or trapezoidal, with, for example, a curved side.

The screen may have a colour at the side facing the carrier which corresponds to the colour of the carrier. It is counteracted in that case that reflection of light by the screen towards the carrier causes local colour shifts of the carrier. If it is desired that the screen transmits light having a different spectrum, the screen may have a colour at a side facing away from the carrier which is different from the colour at the side facing the carrier. A tubular screen may in such a case be built up from, for example, a plate-shaped pan of a first colour which closes a profile of a second colour so as to form a tube. The plate-shaped pan may also have light-scattering or light-spreading properties which are different from those of the profile.

The line illumination device may extend in one line or with angles along a flat carrier. In the latter case, compact fluorescent lamps may also be positioned at corner points between two adjoining tubular lamps. When the device is installed along two walls which enclose an angle with one another, it is also possible to include a compact fluorescent lamp between two tubular lamps in the corner point.

In an arrangement along walls which enclose an exterior angle with one another, three compact lamps may be inserted, if so desired, depending on to what point the tubular lamps extend: one on each wall and one diagonally in the comer point.

Furthermore, if a desired line illumination is longer than can be formed with n tubular lamps and n−1 or n+1 interposed compact fluorescent lamps, the line formed by these lamps may be prolonged to achieve the desired length through the addition of the requisite number of compact lamps and, if desired, mounting members. Such additional mounting members need not comprise lampholders for tubular lamps. For outdoor use they may, just like mounting members at the ends of the arrangement, be closed off with blind nuts.

BRIEF DESCRIPTION OF THE DRAWING

Embodiments of the line illumination device and the mounting member according to the invention are shown in the drawings, in which:

FIG. 6 shows a sixth embodiment of a mounting member with:

FIGS. 6a and b showing a second and a first part, respectively, in perspective view, FIG. 6c showing a cross-section taken on the line VIc—VIc in FIG. 6b, FIG. 6d showing the second part with a third and a fourth part in perspective view, FIGS. 6e and f showing the third and the fourth part, respectively, in perspective view, and FIG. 6g showing a nut in lateral elevation, partly in cross-section, FIG. 7 is an exploded view of a seventh embodiment of the device, FIG. 8 shows a further embodiment with FIG. 8a showing a mounting member in plan view, FIG. 8b showing a fragment of a U-shaped profile for the latter in elevation, FIGS. 8c and 8d being cross-sections taken on the lines VIIIc and d, respectively, in FIG. 8a, and FIG. 8e showing a detail of FIG. VIIIc.

DESCRIPTION OF THE PREFERRED EMBODIMENTS

Figure 1:
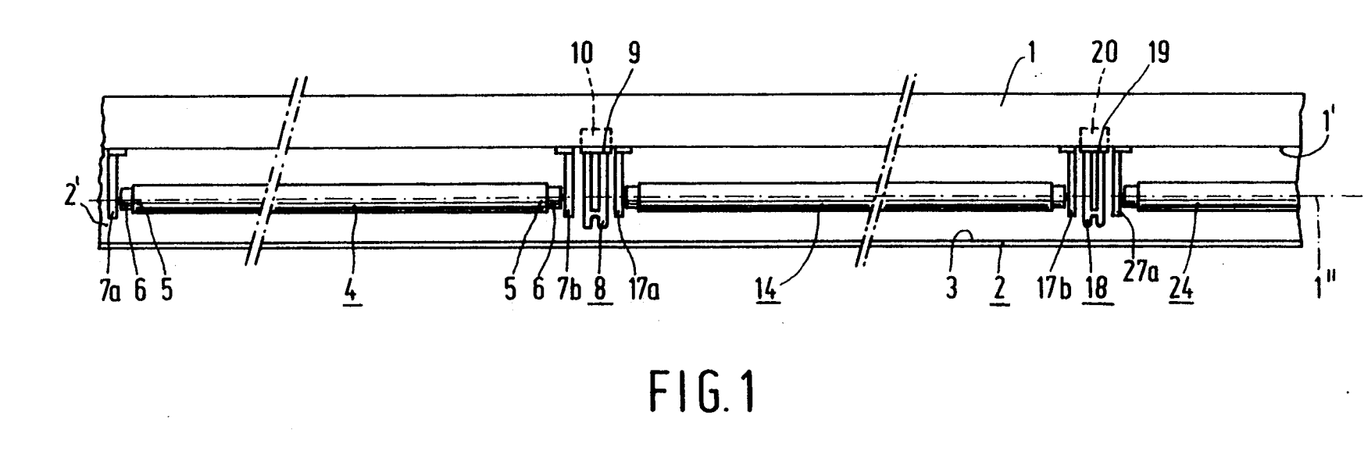
FIG. 1 is a plan view of the device.

In FIG. 1, the line illumination device comprises a carrier 1 which may be a self-supporting wall or a panel which may be fastened against a partition, a wall, or a different surface. The device has several tubular fluorescent lamps 4, 14, 24, in linear arrangement, each having end portions 5 with respective lamp caps 6. The lamps may all be of the same length and power rating, or there may be lamps of a different length among them in order to give the device a length so as to fit the carrier. Lampholder pairs 7a,b; 17a,b; 27a and (not visible) 27b are present, connected to the carrier 1 in which respective lamps 4, 14 and 24 are accommodated with their lamp caps.

A single-ended capped compact fluorescent lamp 8, 18 is arranged between each pair of tubular fluorescent lamps 4, 14; 14,24 with its lamp cap 9, 19 proximate the carrier. Lampholders 10, 20, in which the relevant caps of the compact lamps 8, 18 are held, are present near the carrier, in the Figure in the carrier. The compact lamps shown are of the type in which straight tubes are interconnected in series.

In the embodiment shown, there is a screen 2 with a side 3 facing the carrier, and the tubular and the compact fluorescent lamps are at this side 3 of the screen 2 facing the carrier 1, the latter with their non-capped ends between the tubular lamps. The screen is light-scattering and transmits light generated by the lamps. In the Figure, the screen 2 is connected to the carrier 1 by means of a screen portion 2'.

The lamps 4, 14, 24, 8, 18 are present on an imaginary line 1" in front of the carrier 1 at the side 3 of the screen 2 facing this carrier. The lamps and the screen may be present below a cover, which may or may not transmit light.

If the screen 2 only allows light to issue from the device to the exterior through its side 3 facing the carrier 1, the device during operation yields a straight light line with a very homogeneous brightness.

If the device only or in addition illuminates the carrier 1, the illuminated field of the carrier has a very homogeneous illuminance. It is obvious, however, that the illuminance decreases with an increasing distance to the lamps. Positions with equal distances to the line 1", however, are evenly illuminated.

Figure 2:
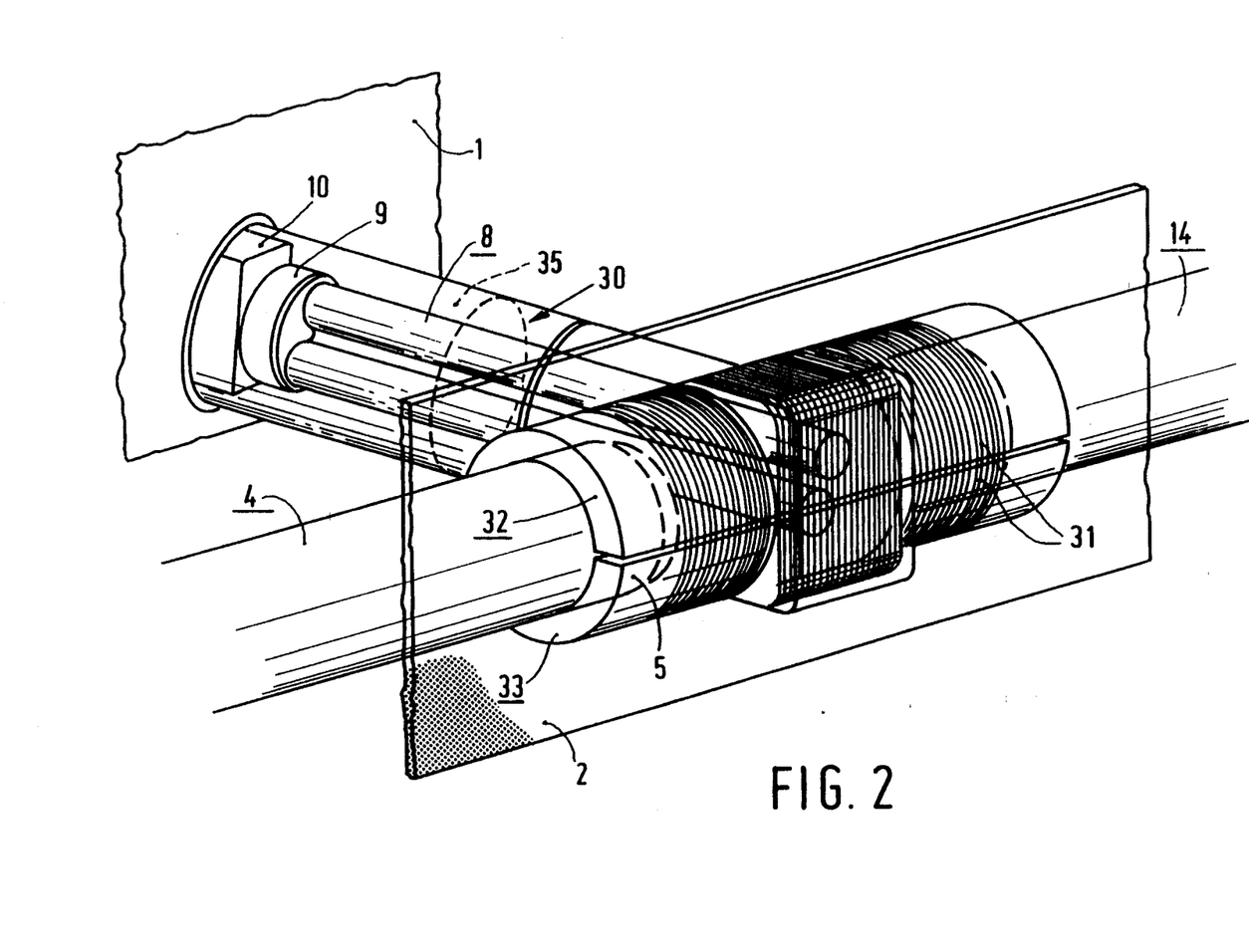
FIG. 2 is a perspective view of a detail of a second embodiment provided with a mounting member.

In FIG. 2, the line illumination device comprises a mounting member 30 connected to a lampholder 10 positioned near the carrier 1. The compact fluorescent lamp 8 is accommodated in the mounting member, which is made of, for example, PMMA, with its lamp cap 9 in said lampholder 10. Relevant parts 7b, 17a (see FIGS. 3 and 4) of two lampholder pairs 7a,b; 17a,b are accommodated in the mounting member 30 at a distance from the carrier 1.

The mounting member 30 shown is a substantially translucent, T-shaped body. It is provided with optically active means. It is light-spreading at a surface 31 which faces away from the carrier 1, towards the screen 2. The mounting member 30 shown is hollow and surrounds the lamp 8 in its entirety and the lamps 4, 14 at their end portions 5. The member is of divided construction, comprising a first, relatively short T-shaped part and a second, longer T-shaped part which is complementary thereto. The division renders it possible to enclose the lamps and to replace them. The parts 32 and 33, however, could have been substantially of the same shape. A portion 35 near the lamp cap 9 and the carrier 1 may be light-scattering and/or coloured.

Figure 3:
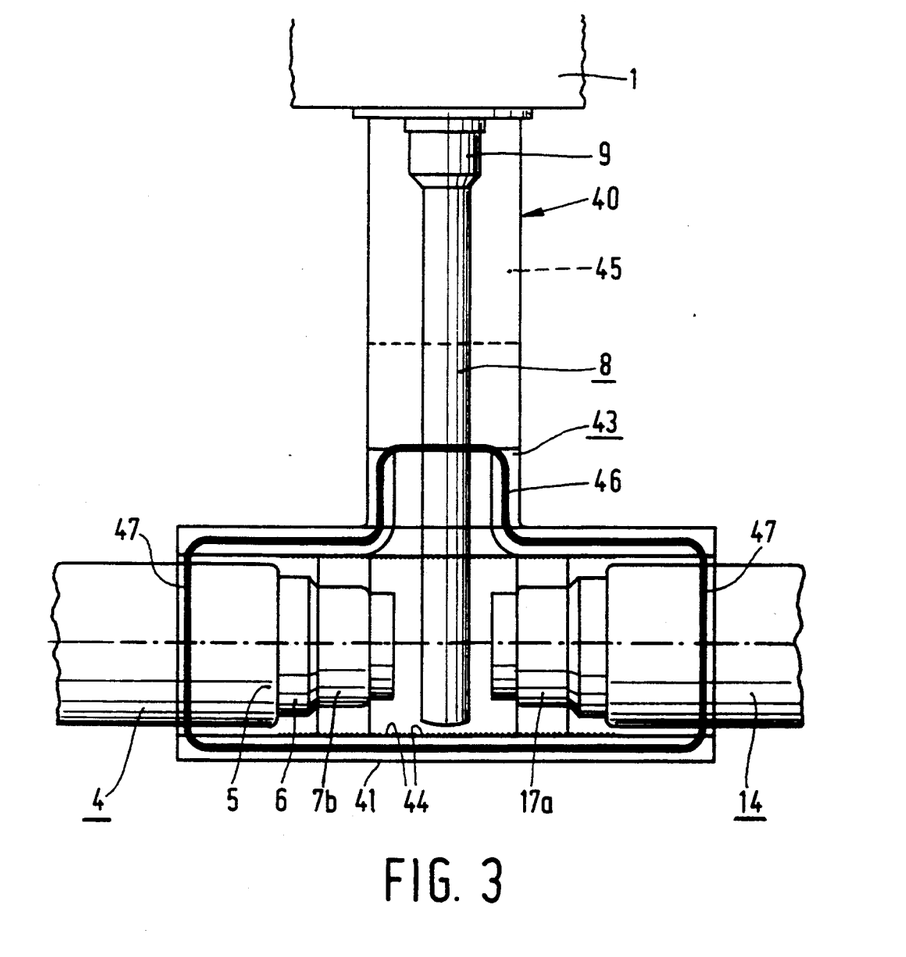
FIG. 3 is a plan view of a detail of a third embodiment provided with a mounting member.

In FIG. 3, parts of the mounting member 40 corresponding to parts from FIG. 2 have reference numerals which are 10 higher. The light-spreading surface 41 derives its optical activity from prismatic ribs 44 at the inside. Lampholder parts 7b, 17a are provided in the member 40. A portion 45 is optically active and has a coloured light filter and/or frosting. Sealing means 46, 47, of which means 47 may be O-rings, facilitate a watertight closure of the mounting member when a part (not shown) corresponding to part 32 of FIG. 2 is provided.

Figure 4A:
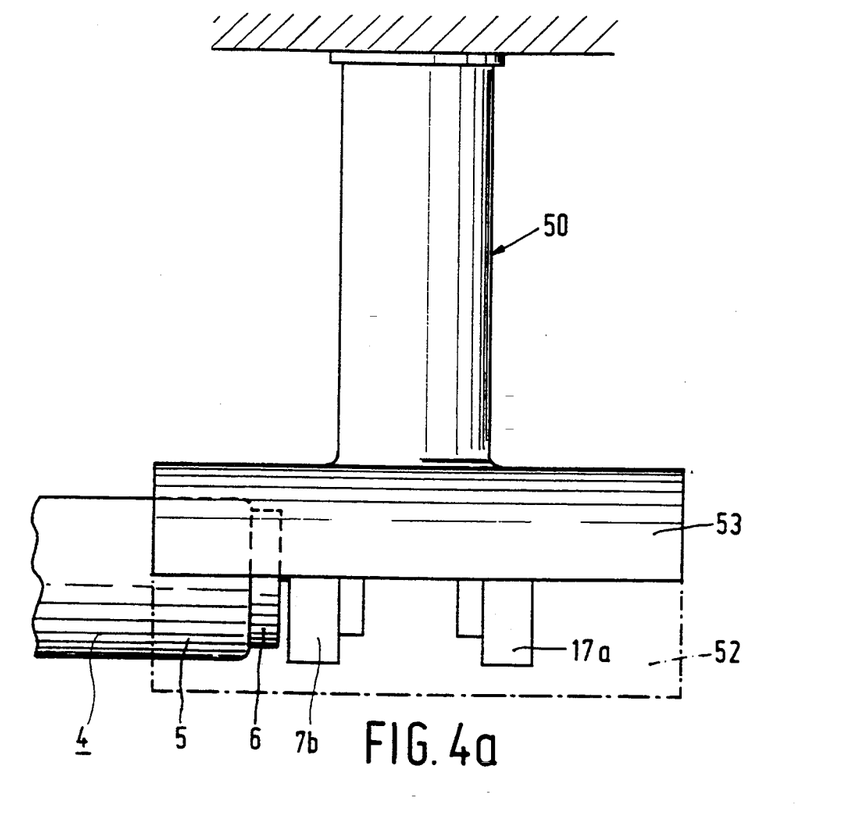
FIG. 4 is a plan view of a detail of a fourth embodiment provided with a mounting member.

The substantially T-shaped mounting member 50 of FIG. 4, in which corresponding parts have reference numerals 10 higher than in FIG. 3, has a substantially T-shaped part 53 and a substantially semi-cylindrical part 52. The part 52 has a colour, at least centrally, which is substantially complementary to that of a screen behind which the mounting member may be positioned. A too strong illumination of said screen can be prevented by this in the case in which, without this colour, an excessive local illumination of the screen would occur. The colour saturation of the part 52 may be lower than that of the screen in this case.

Figure 4B:
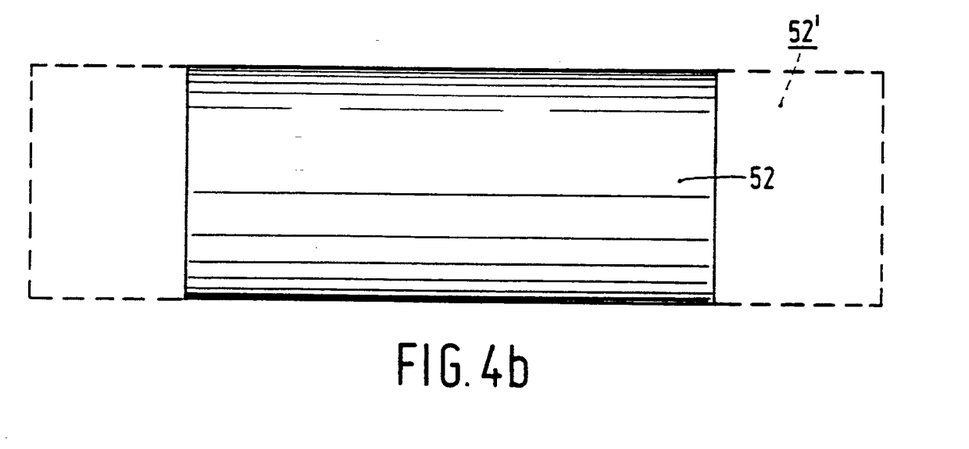

It is indicated with broken lines in FIG. 4b that the part 52 may be a larger body 52', in which case the mounting member 50 may be integral with a screen. The part 52' of the mounting member and of the screen extends to beyond the end portion 5 of a tubular lamp 4.

Figure 5:
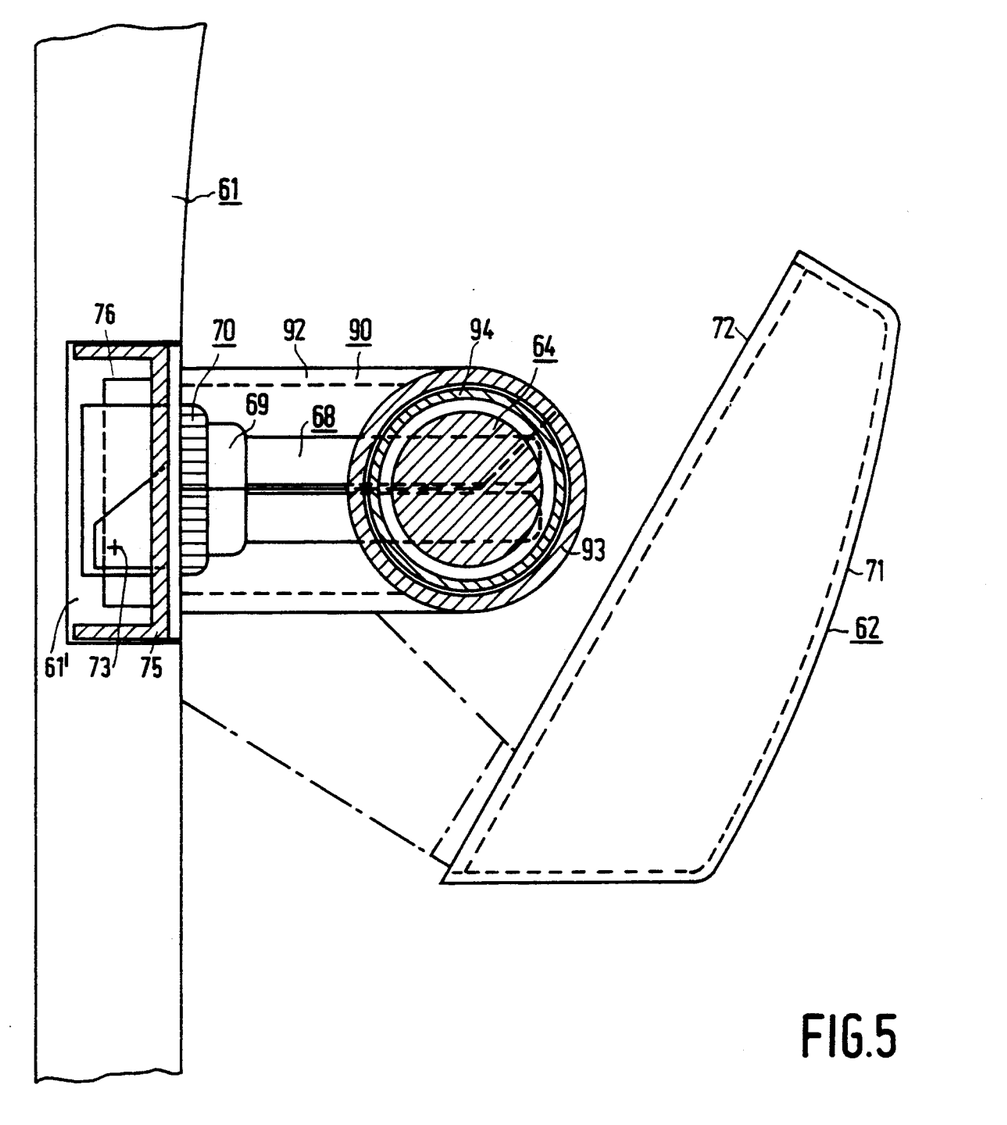
FIG. 5 is a lateral elevation of a fifth embodiment of the device with a mounting member in cross-section.

In FIGS. 5 and 6, parts corresponding to those in FIGS. 1 or 2 have reference numerals which are 60 higher than in the first two Figures.

The line illumination device of FIG. 5 has a tubular screen 62 in front of a carrier 61. The screen is quadrilateral in cross-section with a curved side remote from the carrier. The tube comprises a plate 72 which closes a profile 71. The screen 62 is light-scattering. The plate 72 may, for example, have the same colour as the carrier 61 whereas the profile 71 has a different colour.

The T-shaped mounting member 90 has a first part 92 and a second part 93. A light-transmitting tube 94, which surrounds the tubular fluorescent lamp 64 with clearance, is accommodated in the mounting member 90.

Inside the mounting member 90 there is a compact fluorescent lamp 68 which comprises four parallel tube sections and has its lamp cap 69 enclosed in a lampholder 70 which is connected to the mounting member 90 with tilting possibility about an axis 73. The axis 73 lies in the plane of the T of the mounting member and is substantially parallel to the tubular lamp 64.

The carrier 61 has a duct-shaped cavity 61'. The mounting member 90 has a profile 75, U-shaped in the Figure, to which it is fixed. Other parts of the device: the lampholder 70, lampholder parts for tubular fluorescent lamps 64 not visible in the Figure, are secured to the profile 75 via the mounting member. The screen 62 may also be secured to this profile. The profile 75 is accommodated and fastened in the duct-shaped cavity 61'. Supply means 76 such as electric or electronic circuits are accommodated in the profile for starting, operating, stabilizing and possibly dimming of the tubular and the compact fluorescent lamps. The lamps and the screen in the Figure have a much smaller vertical dimension than the carrier. The profile renders it possible to unite the remaining parts of the device with the carrier in one operation or in segments, in longitudinal sections, as easily manageable units.

Figures 6A, 6B:
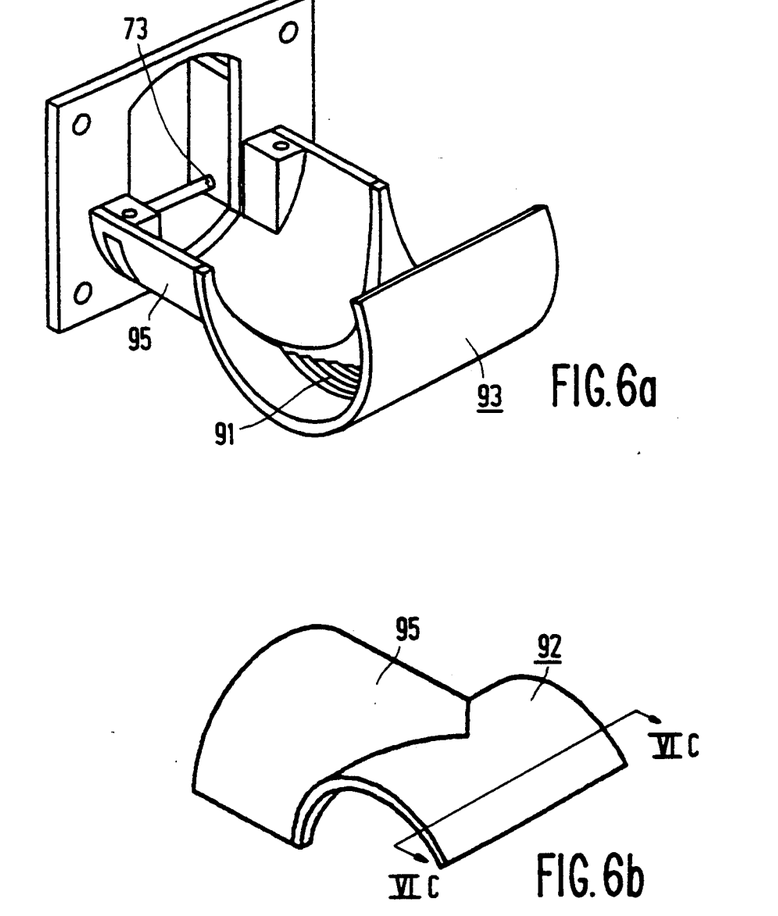
Figure 6C:
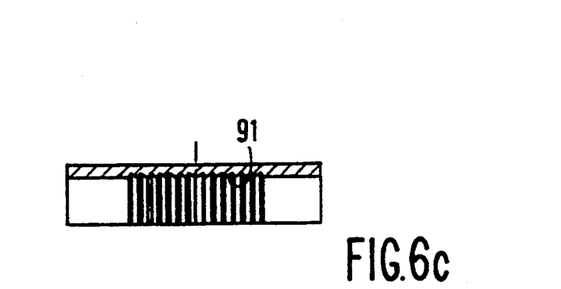

The mounting member of FIG. 6 comprises, as shown in FIG. 6a,b, a second and a first part 93, 92, respectively, each provided with prismatic grooves as depicted in FIG. 6c for spreading the light issuing from the mounting member and for guiding light into the material of the mounting member. The portions 95 are frosted for scattering the light issuing there.

Figure 6D:
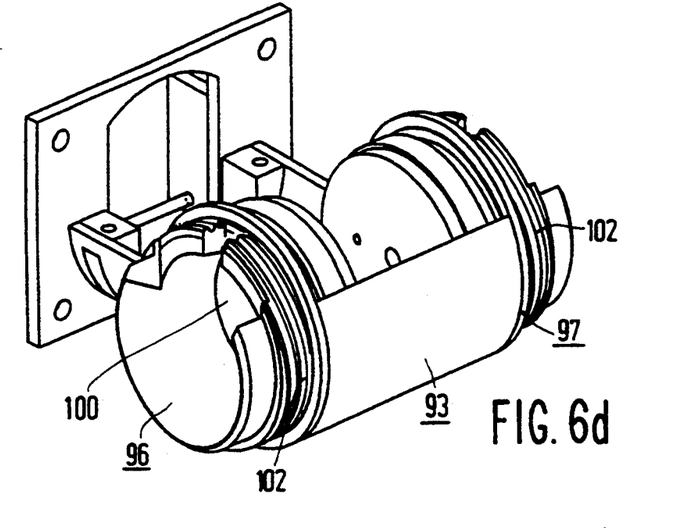
Figure 6E:
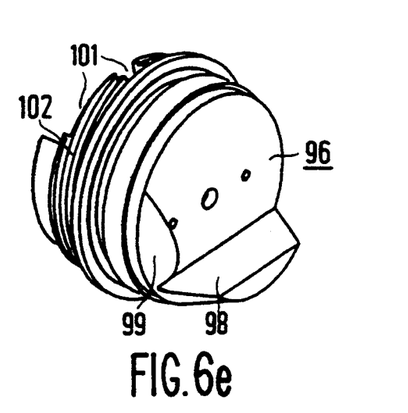
Figure 6F:
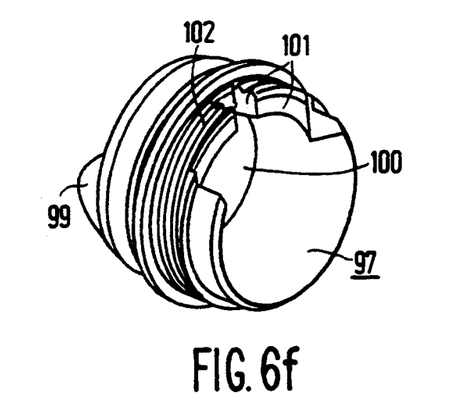

A third and a fourth part 96 and 97, respectively, which are one another's mirrored images, are joined together with the second part 93 in FIG. 6d, for example, indetachably connected thereto or integral therewith. The third and the fourth part, see FIG. 6e,f, each comprise a moulded piece 98, 99 in the shape of a cone segment, which pieces lie near the lampholder parts for the tubular fluorescent lamps. These lampholder parts are accommodated in respective cavities 100. Recesses 101 serve to admit the lamp cap and the attached contact pins of a tubular lamp. Screwthread 102 is capable of accommodating a nut with sealing ring and of allowing light to emerge from the material of the mounting member.

Figure 6G:
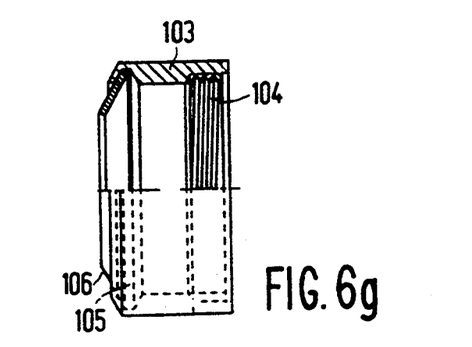
Figure 8A:
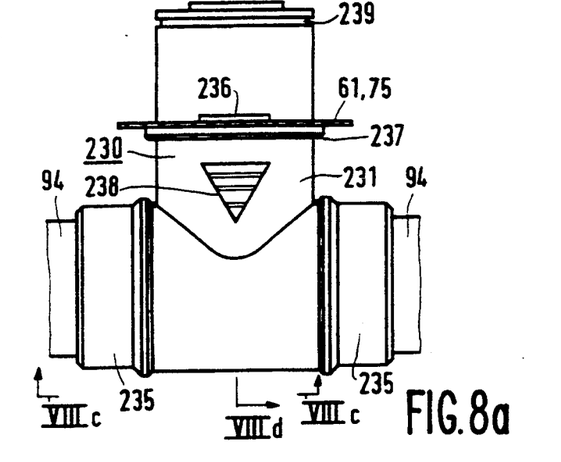
Figure 8B:
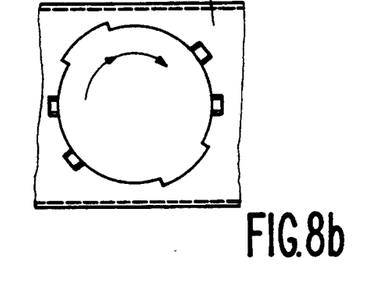
Figure 8C:
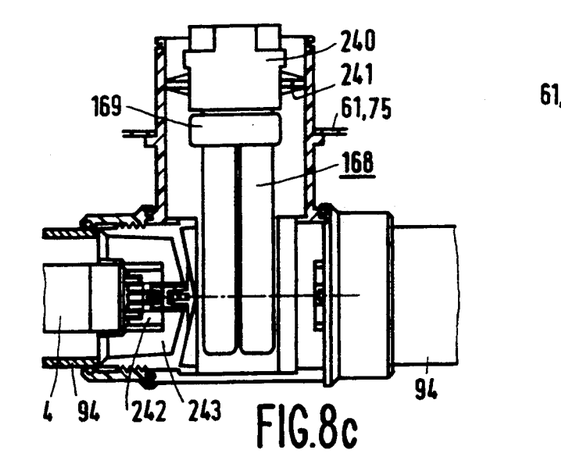
Figure 8D:
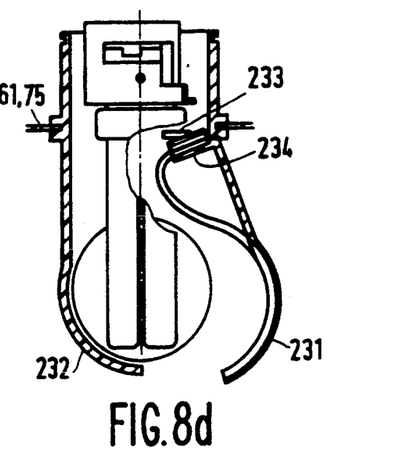
Figure 8E:
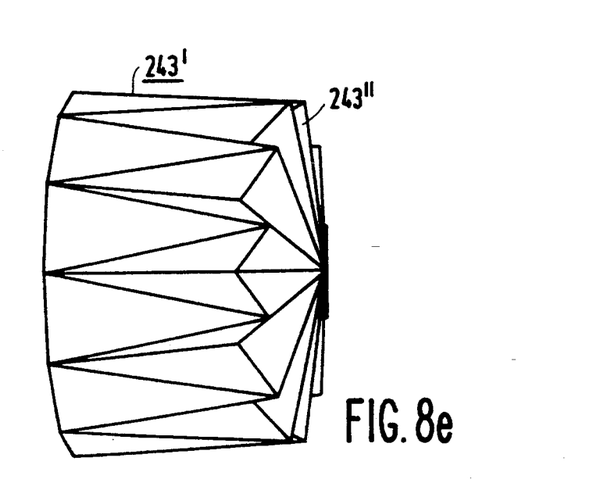

The nut 103 of FIG. 6g has a screwthread 104 which is to cooperate with the screwthread 102. The nut has a narrowing groove 105 in which a flat sealing ring 106 is accommodated, which ring has assumed a conical shape on account of the ring's excess size and the shape of the groove, thus closing around the tubular lamp.

In FIG. 7, the line illumination device has a mounting member 190 with a first 192 and a second part 193 which are substantially T-shaped. The mounting member is provided with screwthread 202. The parts 192, 193 can be or are coupled at a first end by their cooperating portions 212,213: hooks 212 and the boundary 213 of an opening in a flange 214.

At a second end, they can be coupled or are held coupled by nuts 203 cooperating with the screwthread 202. It is not necessary, however, for the parts 192 and 193 to be both fitted with screwthread for this purpose. It may suffice that only one of the two has screwthread. In the geometry shown, for example, in which the screwthread 202 of the first part 192 comprises only approximately one quadrant, this screwthread could be dispensed with. A sloping inlet surface could be present there instead.

A compact fluorescent lamp 168 can be introduced into the second part 193, the first part 192 being removed, and be accommodated with its lamp cap 169 in a lampholder to be placed near the flange 214. Moulded pieces 196, 197 can be accommodated in the second part 193 in order to fix lampholder portions for the tubular lamps 164 therein, for example, of the type into which the lamps can be inserted and electrically connected by a simple transverse translation.

In FIG. 8, the T-shaped mounting member 230 has a first 231 and a second part 232 which are coupled by means of a snap connection 233,234 (FIG. 8d) at one end, and which can be kept coupled together by nuts 235 cooperating with screwthread at a second end. The two parts are joined to one another and to the nuts with a watertight seal. The nuts each surround a respective pipe 94 around a tubular lamp 4 (FIG. 8c) in a watertight manner. The mounting member has an interrupted first 236 and a second circumferential collar 237 which provide a bayonet coupling to a carrier 61 or to a profile 75 to be accommodated therein. The first part 231 has a prismatic profile on the inside near the carrier 61 for guiding light into the material of the mounting member and away from the carrier. The mounting member has a groove 239 for coupling it to a grommet for a watertight seal and a watertight cabling passage. A compact fluorescent lamp 168 is accommodated with its lamp cap 169 in a lampholder which is suspended in the mounting member with tilting possibility, pivoting about an axis 241 which is parallel to the lamps 4. Lampholders 242 for tubular lamps are arranged in the mounting member (FIG. 8c), into which lampholders such a lamp can be mounted by slipping in sideways. The lampholders 242 are each accommodated in a cavity 243 bounded by walls with prismatic grooves. A moulding 243' of this cavity is shown in FIG. 8e. The mounting member 230 shown has surfaces which face the compact lamp 168 and which have the appearance of the portion 243", with radially extending grooves. Light coming from the compact lamp is guided into the material of the mounting member by the grooves and radiated inter alia by the nuts.

We claim:

1. A line illumination device comprising:
   a carrier,
   a plurality of tubular fluorescent lamps in a linear arrangement and each of which has end portions with respective lamp caps,
   a plurality of lampholder pairs which are connected to the carrier and in each of which a respective fluorescent lamp is held via its lamp caps, characterized in that
   between each two adjacent tubular fluorescent lamps a respective single-ended capped compact fluorescent lamp is accommodated, with its lamp cap in a lamp holder which is mounted proximate to the carrier, whereby said line illumination device provides greater evenness in brightness and illuminance.

2. A line illumination device as claimed in claim 1, further comprising a mounting member connected to a lampholder which is positioned near the carrier, wherein the mounting member accommodates the compact fluorescent lamp and with the lamp cap of the compact fluorescent lamp in said lampholder, and respective parts of two lampholder pairs are accommodated in said mounting member and at a distance from the carrier.

3. A line illumination device as claimed in claim 2, wherein the mounting member comprises a substantially light-transmitting T-shaped body.

4. A line illumination device as claimed in claim 3, wherein the mounting member comprises optically active means.

5. A line illumination device as claimed in claim 2, the mounting member substantially surrounds a respective compact fluorescent lamp and is divided so as to comprise a first and a second part.

6. A line illumination device as claimed in claim 5, wherein the tubular fluorescent lamps are each surrounded by a tube extending between their end portions and with a space between the tubular fluorescent lamp and the tube.

7. A line illumination device as claimed in claim 5 or 6, wherein the mounting member is sealed in a watertight manner at least outside the carrier.

8. A line illumination device as claimed in claim 2, wherein the carrier has a duct-shaped cavity and the mounting member has a profile which is enclosed in said cavity.

9. A line illumination device as claimed in claim 2 or 8, wherein the mounting member is fixed to the carrier by means of a bayonet coupling.

10. A line illumination device as claimed in claim 1 or 2, further comprising a screen which is connected to the carrier and having a side facing the carrier wherein the tubular and the compact fluorescent lamps are arranged at said side of the screen which faces the carrier.

11. A line illumination device as claimed in claim 10, wherein the screen has the shape of a tube.

12. A line illumination device as claimed in claim 11, wherein the screen comprises a plate shaped so as to form a tube.

13. A line illumination device as claimed in claim 2, the lampholder for the compact fluorescent lamp is tiltably mounted about a pivot axis which extends substantially parallel to the tubular fluorescent lamps.

14. A line illumination device comprising:
   an elongate carrier,
   a plurality of tubular fluorescent discharge lamps linearly aligned and with each lamp having end portions including respective lamp caps,
   a plurality of lamp holder pairs coupled to the carrier and in each of the lamp holder pairs a respective discharge lamp is mounted via its respective lamp caps, and
   a plurality of single-ended capped compact fluorescent discharge lamps and with a respective compact fluorescent discharge lamp mounted between each two adjacent tubular fluorescent discharge lamps and with its lamp cap proximate the carrier and wherein the compact fluorescent discharge lamps are chosen so that they just radiate sufficient light to compensate for otherwise dark spaces between any two adjacent tubular fluorescent discharge lamps thereby to produce a line of light of even brightness along the length of said line illumination device.

15. A line illumination device as claimed in claim 14 further comprising:

a mounting member secured to and supported by said carrier, and wherein said compact fluorescent discharge lamp and two lamp holders for adjacent tubular fluorescent discharge lamps are positioned inside of said mounting member.

16. A line illumination device as claimed in claim 15 wherein the mounting member comprises a substantially light-transmissive T-shaped hollow body.

17. A line illumination device as claimed in claim 14 wherein said carrier supports the tubular fluorescent discharge lamps, the compact fluorescent discharge lamp, and the plurality of lamp holder pairs.

* * * * *